US012413907B2

(12) United States Patent
Chiu et al.

(10) Patent No.: US 12,413,907 B2
(45) Date of Patent: Sep. 9, 2025

(54) DEVICE AND METHOD FOR AUDIO SIGNAL PROCESSING

(71) Applicant: Elite Semiconductor Microelectronics Technology Inc., Hsinchu (TW)

(72) Inventors: Hsin-Yuan Chiu, Hsinchu (TW); Chia-Ling Hsieh, Hsinchu (TW)

(73) Assignee: Elite Semiconductor Microelectronics Technology Inc., Hsinchu (TW)

( * ) Notice: Subject to any disclaimer, the term of this patent is extended or adjusted under 35 U.S.C. 154(b) by 577 days.

(21) Appl. No.: 17/864,182

(22) Filed: Jul. 13, 2022

(65) Prior Publication Data

US 2024/0022857 A1 Jan. 18, 2024

(51) Int. Cl.
*H04R 5/04* (2006.01)
*H04S 1/00* (2006.01)

(52) U.S. Cl.
CPC ............... *H04R 5/04* (2013.01); *H04S 1/007* (2013.01)

(58) Field of Classification Search
CPC ........ H04R 5/04; H04R 3/00; H04R 2430/00; H04S 1/007
See application file for complete search history.

(56) References Cited

U.S. PATENT DOCUMENTS

2008/0219295 A1* 9/2008 Umehara ............ H04L 27/2655 370/512
2020/0082833 A1 3/2020 Chebiyyam
2022/0070586 A1 3/2022 Chen et al.
2022/0150631 A1* 5/2022 Namekawa .............. H04R 3/12

FOREIGN PATENT DOCUMENTS

CN 106301644 A 1/2017
CN 109817230 A 5/2019
TW 202211692 A 3/2022
WO 2010131105 A1 11/2010
WO 2016183955 A1 11/2016

OTHER PUBLICATIONS

TW Office Action cited in TW11320439970, mailed May 1, 2024, 5 pages.

* cited by examiner

*Primary Examiner* — Charles R Kasenge
(74) *Attorney, Agent, or Firm* — Cooper Legal Group LLC

(57) ABSTRACT

A device for audio signal processing includes a main processor and two audio processors electrically connected with the main processor. Each audio processor corresponds to a channel of a stereo audio output. The main processor provides an indication signal for the two audio processors. Each audio processor generates a synchronization signal according to the indication signal and performs audio signal processing according to the synchronization signal. The synchronization signals begin simultaneously and have the same frequencies that equal a sampling frequency. Each synchronization signal includes at least one pulse, and a start of each pulse of each synchronization signal is aligned in time with a start of a pulse of the indication signal. The audio signal processing performed by each audio processor begins at an end of one of the at least one pulse in the synchronization signal corresponding to the audio processor.

18 Claims, 5 Drawing Sheets

DEVICE AND METHOD FOR AUDIO SIGNAL PROCESSING

BACKGROUND

Technical Field

The present disclosure relates to a device and a method for audio signal processing. More specifically, the present disclosure relates to a device and a method for inter-channel phase-shift calibration for audio speakers.

Descriptions of the Related Art

In existing practices, a resetting process for an audio processor is necessary before a series of audio signal processing such as DSP, PWM, SDM, etc. Although it is feasible to adopt only one processor/integrated circuit (IC) for both the left and right channels (speakers), some audio systems adopt one processor for each channel (i.e., two processors for the two channels respectively) to increase their total output wattage. In the case where the two processors are equipped with their own resetting pins, the resetting process for the two processors may be performed simultaneously via a hardware reset (i.e., providing a single resetting signal to the two resetting pins at the same time). However, the resetting processes for the two processors have to be performed sequentially via a software reset in the case where the two processors are not equipped with their own resetting pins. Under such circumstances, a series of audio signal processing following the software reset will start at different time points because the two processors are reset at different time points, and thus a phase difference between the two channels exists.

FIG. 1 depicts a conventional way of audio signal processing in an audio system that adopts one processor for each channel. Please refer to FIG. 1. It is assumed that the sampling frequency and input frequency of the audio signal processing (indicated by the LRCIN signal in an Inter-IC Sound ($I^2S$) format) are 48,000 HZ and 1,500 HZ, respectively. The resetting signals RS01 and RS02 are respectively provided for the left and right channels, and a DSP of each channel will be performed when the corresponding resetting signal goes up to a logical high. Each channel starts the audio output (i.e., output signals O01 and O02) after the first round of DSP therein is completed.

As explained previously, the resetting processes via software (i.e., the software reset) for the processors corresponding to the two channels are performed sequentially, and thus there exists a time difference TD1 between the starts of the first round of DSP of the two channels, which further leads to a phase difference PD1 between the two output signals O01 and O02. The phase difference can be calculated according to Equation 1 as follows:

$$PD=\mathrm{mod}(TD,1/Fs)\times Fi\times 360 \quad \text{(Equation 1)}$$

wherein "PD" is the phase difference of two output signals (e.g., the phase difference PD1 as shown in FIG. 1); "TD" is the time difference between the rising edges of two resetting signals (e.g., the time difference TD1 and the resetting signals RS01 and RS02, as shown in FIG. 1); "Fs" is the sampling frequency; and "Fi" is the input frequency. Assuming that the time difference TD1 is 11.22 μs, the phase difference PD1 can thus be calculated according to Equation 1 as mod (11.22μ, 1/48000)×1500×360, i.e., 6.05 degrees.

The output signals O01 and O02 remain consistent when the phase difference PD1 equals 360*N degrees (wherein N is a positive integer, meaning that the phase difference between the two channels is one or more than one entire sine waves). On the contrary, the output signals O01 and O02 become inconsistent when the phase difference PD1 is not 360*N degrees, which might affect the user experience because the sounds coming from the two channels will also be inconsistent with each other.

In view of this, there is an urgent need in the art for a new way of calibrating the phase shift between the left and right channels of the audio system that adopts one processor for each channel, such that the output signals of the two channels remain consistent.

SUMMARY

To solve at least the abovementioned problem, the present disclosure provides a device for audio signal processing. The device may at least comprise two audio processors and a main processor electrically connected with the two audio processors. Each audio processor may correspond to a channel of a stereo audio output and be configured to generate a synchronization signal according to an indication signal and perform audio signal processing according to the synchronization signal. The synchronization signals may begin simultaneously and have the same frequencies that equal a sampling frequency. Each synchronization signal comprises at least one pulse, and a start of each pulse of each synchronization signal is aligned in time with a start of a pulse of the indication signal. The audio signal processing performed by each audio processor begins at an end of one of the at least one pulse in the synchronization signal corresponding to the audio processor.

To solve at least the abovementioned problem, the present disclosure also provides a method for audio signal processing. The method may comprise steps as follows: providing, by a main processor, an indication signal for two audio processors simultaneously, each audio processor corresponding to a channel of a stereo audio output; generating, by each audio processor, a synchronization signal according to the indication signal; and performing, by each audio processor, audio signal processing according to the synchronization signal generated by itself. The synchronization signals begin simultaneously and have the same frequencies that equal a sampling frequency. Each synchronization signal comprises at least one pulse, and a start of each pulse of each synchronization signal is aligned in time with a start of a pulse of the indication signal. The audio signal processing performed by each audio processor begins at an end of one of the at least one pulse in the synchronization signal corresponding to the audio processor.

The device and method for audio signal processing provided by the present disclosure may calibrate the phase shift between output signals of the two audio processors via the synchronization signals generated by the two audio processors themselves. The audio signal processing in each channel is pended (even when the corresponding resetting signal has already gone up to the logical high) until a pulse of the synchronization signal for triggering the audio signal processing appears. Since the synchronization signals begin simultaneously and have the same frequencies that equal a sampling frequency (i.e., $f_s$), the time difference between any two pulses in the synchronization signal would be N/fs, with N being an integer. Moreover, the audio signal processing performed by each audio processor (corresponding to each channel) begins at an end of a pulse in the synchronization signal, and thus the phase difference between the two channels equals 360*N degrees, thereby keeping the audio outputs of the two channels consistent. In view of this, the device and method for audio signal processing provided by the present disclosure indeed solve the abovementioned problem in the art.

Moreover, the present disclosure provides a simpler and more straightforward way of calibration than the conventional ones. The conventional techniques would have to detect the phase difference, and then calibrate the output signal of one of the two channels, but such processes are unnecessary in the present disclosure.

This summary overall describes the core concept of the present invention and covers the problem to be solved, the means to solve the problem and the effect of the present invention to provide a basic understanding of the present invention by those of ordinary skill in the art. However, it shall be appreciated that, this summary is not intended to encompass all embodiments of the present invention but is provided only to present the core concept of the present invention in a simple form and as an introduction to the following detailed description. The detailed technology and preferred embodiments implemented for the subject invention are described in the following paragraphs accompanying the appended drawings for people having ordinary skills in the art to well appreciate the features of the claimed invention.

BRIEF DESCRIPTION OF THE DRAWINGS

The drawings can assist the description of the present disclosure, wherein.

DETAILED DESCRIPTION

In the following description, a device and a method for audio signal processing provided by the present disclosure will be explained with reference to embodiments thereof. However, these embodiments are not intended to limit the present invention to any environment, applications, or implementations described in these embodiments. Therefore, description of these embodiments is only for purpose of illustration rather than to limit the present invention. It should be appreciated that, in the following embodiments and the attached drawings, elements unrelated to the present invention are omitted from depiction. In addition, dimensions of and dimensional scales among individual elements in the attached drawings are provided only for illustration, but not to limit the scope of the present invention.

Figure 1:
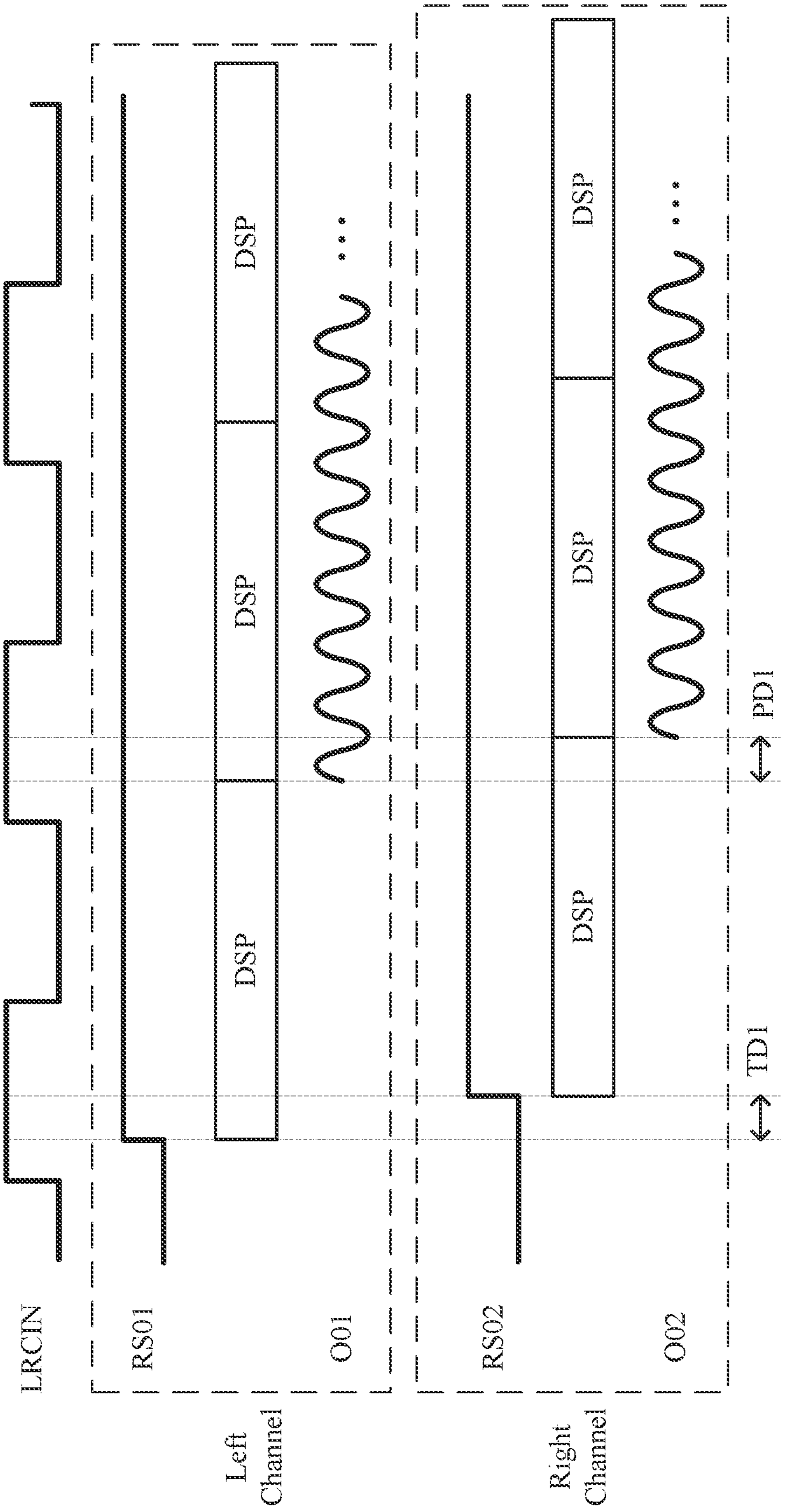
(Prior Art) FIG. 1
FIG. 1 depicts a schematic view of a conventional audio signal processing in an audio system that adopts one processor for each channel.
Figure 2:
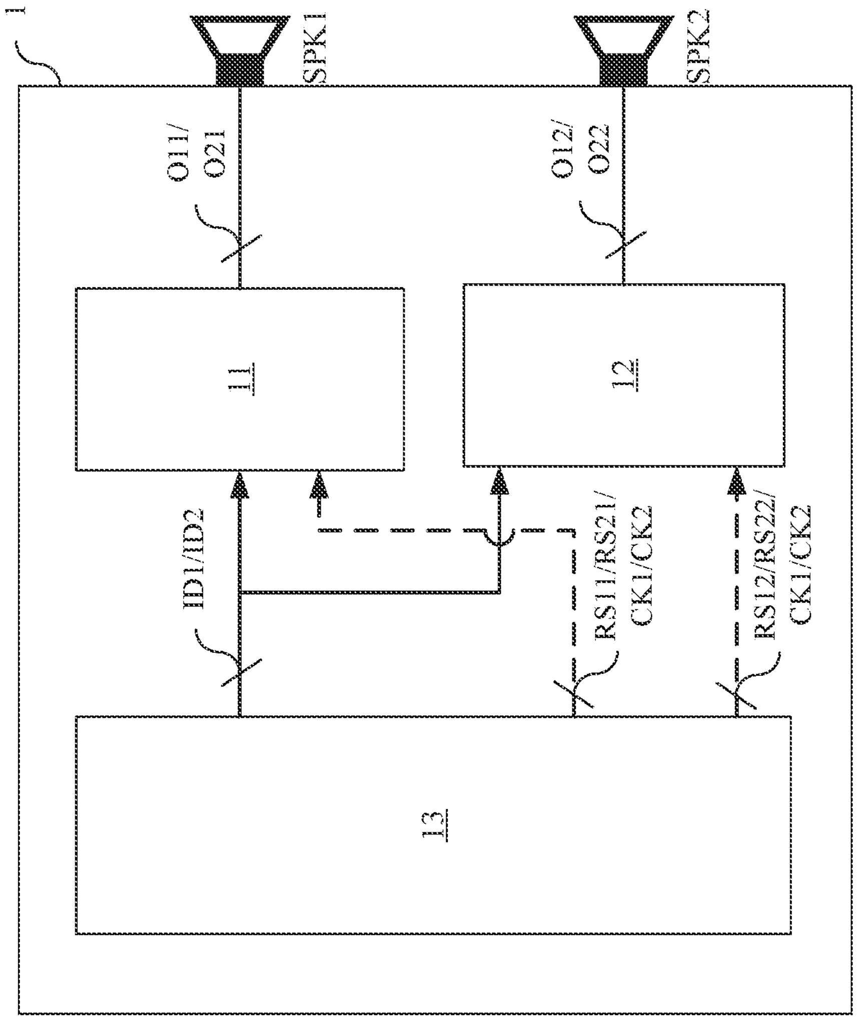
FIG. 2 depicts a schematic view of a device for audio signal processing according to one or more embodiments of the present disclosure.

FIG. 2 depicts a schematic view of a device for audio signal processing according to one or more embodiments of the present disclosure. The contents shown in FIG. 2 are only for easily illustrating the embodiments, instead of limiting the scope of the present disclosure.

Please refer to FIG. 2. A device 1 for audio signal processing may basically comprise two audio processors 11 and 12 corresponding to two output channels (e.g., the left and right channels), and a main processor 13 electrically connected with the audio processors 11 and 12. Each output channel may correspond to at least one audio output component. For example, the audio processors 11 and 12 may correspond to audio output components SPK1 and SPK2, respectively. The audio output components SPK1 and SPK2 may be, for example, a speaker, a headphone, or any other audio output device well-known to those of ordinary skill in the art.

Note that the present disclosure recites two output channels only for ease of description. That is, the device 1 in some other embodiments may be configured for implementing more than two output channels.

Each of the audio processors 11 and 12 includes any of various microprocessors, microcontrollers, and/or other circuits capable of performing audio signal processing such as DSP, sigma-delta modulation (SDM), pulse-width modulation (PWM), etc. On the other hand, the main processor 13 includes any of various microprocessors, microcontrollers, and/or other circuits capable of generating and providing control signals and data signals for the audio processors 11 and 12, such that the audio processors 11 and 12 may execute the operations as described herein accordingly. The abovementioned microprocessor or the microcontroller is a kind of programmable special integrated circuit that has the functions of operation, storage, output/input or the like. Moreover, the microprocessor or the microcontroller can accept and process various coded instructions, thereby performing various logical operations and arithmetical operations, and outputting corresponding operation results. Each of the audio processors 11 and 12 and the main processor 13 may be programmed to interpret various instructions so as to process the data/signal in the device 1 and execute various operational programs or applications.

Figure 3A:
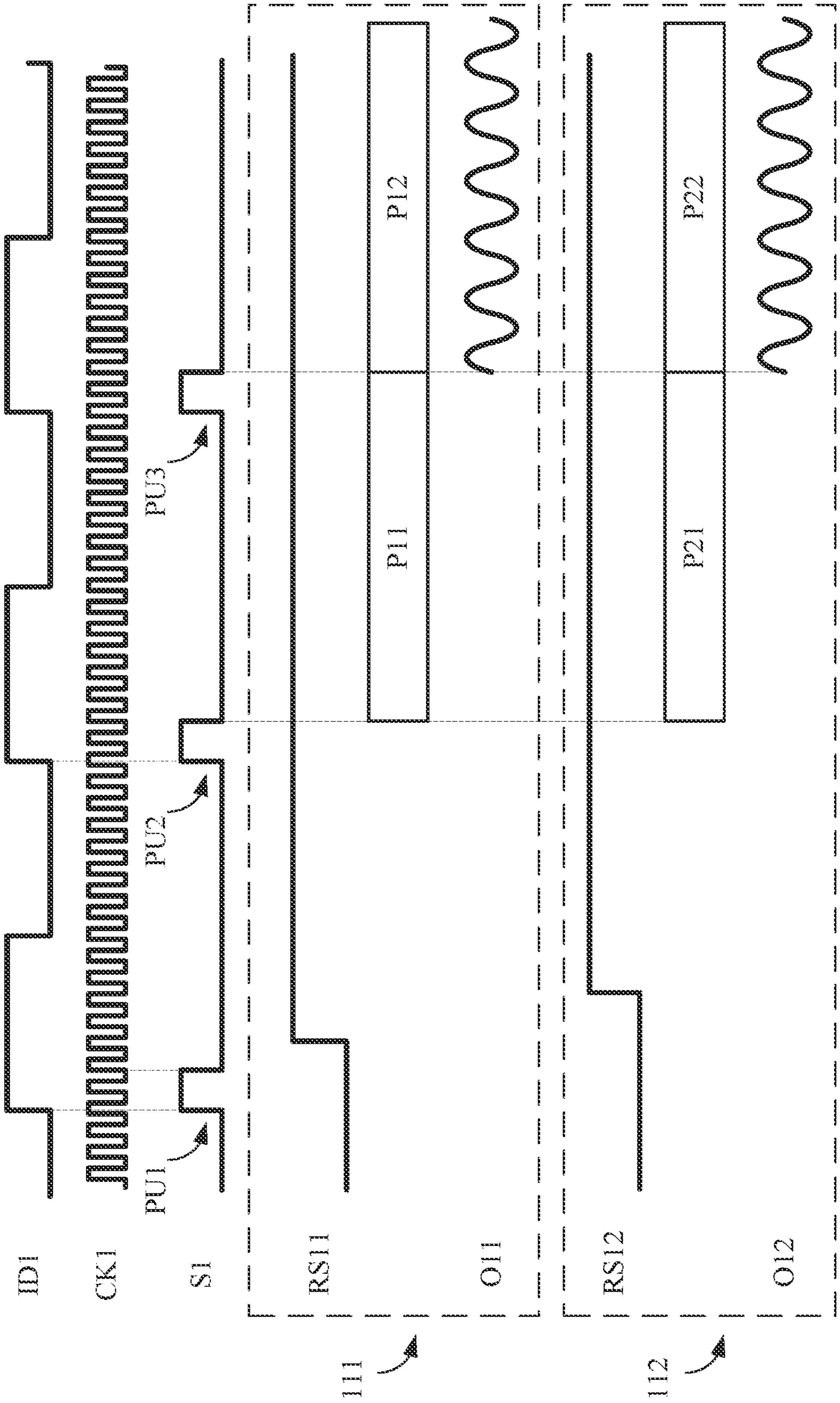
FIGS. 3A-3B depict schematic views of audio signal processing performed by the device shown in FIG. 2.

FIG. 3A depicts a schematic view of audio signal processing performed by the device 1 shown in FIG. 2. The contents shown in FIG. 3A are only for easily illustrating the embodiment of the present disclosure, instead of limiting the scope of the present disclosure.

Please refer to FIG. 2 and FIG. 3A. An output channel 111 corresponds to the audio processor 11 and the audio output component SPK1, and an output channel 112 corresponds to the audio processor 12 and the audio output component SPK2.

The main processor 13 may be configured to provide an indication signal ID1 for the audio processors 11 and 12, simultaneously. The indication signal ID1 may be any signal capable of indicating a start of a series of packets that corresponds to one of the channels. For example, when the audio signal is in the $I^2S$ format, the indication signal ID1 may be the LRCIN signal. However, in some other embodiments, when the audio signal is in a Sony/Philips Digital Interface Format (S/PDIF), the indication signal ID1 may be a preamble in S/PDIF, and for example, the indication signal ID1 may be one of the preamble X, preamble Y, and preamble Z of S/PDIF.

The audio processor 11 may be configured to generate a first synchronization signal according to the indication signal ID1, and the audio processor 12 may be configured to generate a second synchronization signal according to the indication signal ID1 as well. The audio processor 11 may perform its audio signal processing according to the first synchronization signal, and the audio processor 12 may perform its audio signal processing according to the second synchronization signal.

The first synchronization signal and the second synchronization signal may be generated and begin at the same time (because the indication signal ID1, theoretically, is provided for the audio processors 11 and 12 simultaneously) and have the same frequencies that equal the sampling frequency (e.g., 48,000 HZ). That is, the first and second synchronization signals may be considered substantially the same, and thus they are shown in FIG. 3A as a synchronization S1 shared by both of the audio processors 11 and 12 for ease of description. The same situation also applies to the synchronization signal S2 shown in FIG. 3B, which will be further described later.

In some embodiments, the main processor 13 may be configured to provide resetting signals RS11 and RS12 for the audio processors 11 and 12, respectively, so as to perform a software reset for each of the two audio processors 11 and 12. The software reset for the two audio processors 11 and 12 are performed sequentially. That is, one of the resetting signals RS11 and RS12 goes up to a logical high before the other one does. For example, as shown in FIG. 3A, the resetting signal RS11 goes up to the logical high before the resetting signal RS12 does.

The synchronization signal S1 may comprise at least one pulse. For example, there are three pulses PU1, PU2 and PU3 of the synchronization signal S1 in FIG. 3A, and a start of each pulse of the synchronization signal S1 may be aligned in time with a start of a pulse of the indication signal ID1.

In some embodiments, the main processor 13 may be configured to provide a clock signal CK1 for the audio processors 11 and 12, simultaneously. The clock signal CK1 may comprise a plurality of pulses, and an end of each pulse in the synchronization signal S1 is aligned in time with a start of one of the pulses in the clock signal CK1. That is, the synchronization signal S1 may be generated by the audio processors 11 and 12 according to both the indication signal ID1 and the clock signal CK1.

The audio signal processing performed by each of the audio processor 11 or 12 may be a digital signal processing (DSP) or other processing that follows the DSP (e.g., S/H2, Sigma-delta modulation (SDM), pulse-width modulation (PWM), etc.)

Each audio signal processing may begin at the end of one of the at least one pulse in the synchronization signal S1. More specifically, as shown in FIG. 3A, the audio signal processing P11 performed by the audio processor 11 may begin at the end of the pulse PU2, even if the resetting signal RS11 had already gone up to the logical high. Similarly, the audio signal processing P21 performed by the audio processor 12 may begin at the end of the pulse PU2, even if the resetting signal RS12 had already gone up to the logical high.

Since the starts of the audio signal processing P11 and P21 are aligned in time with each other, the output signals O11 and O12 respectively corresponding to the audio signal processing P11 and P21 shall begin simultaneously (i.e., following the end of their corresponding audio signal processing). Thus, there is no phase difference between the output signals O11 and O12.

The audio processors 11 and 12 may provide the output signals O11 and O12 for the audio output components SPK1 and SPK2, respectively. The audio output components SPK1 and SPK2 may then provide the audio outputs according to the output signals O11 and O12.

In some embodiments, the signals transmitted between the main processor 13 and the audio processors 11 and 12 may be transmitted via the interface such as GPIO, $I^2C$, TDM, $I^2S$ etc., and thus the main processor 13 as well as the audio processors 11 and 12 may each comprise at least one port or other means for signal transmission corresponding to said interface. However, the abovementioned interfaces are not limitations to the signal transmission of the present disclosure.

Figure 3B:
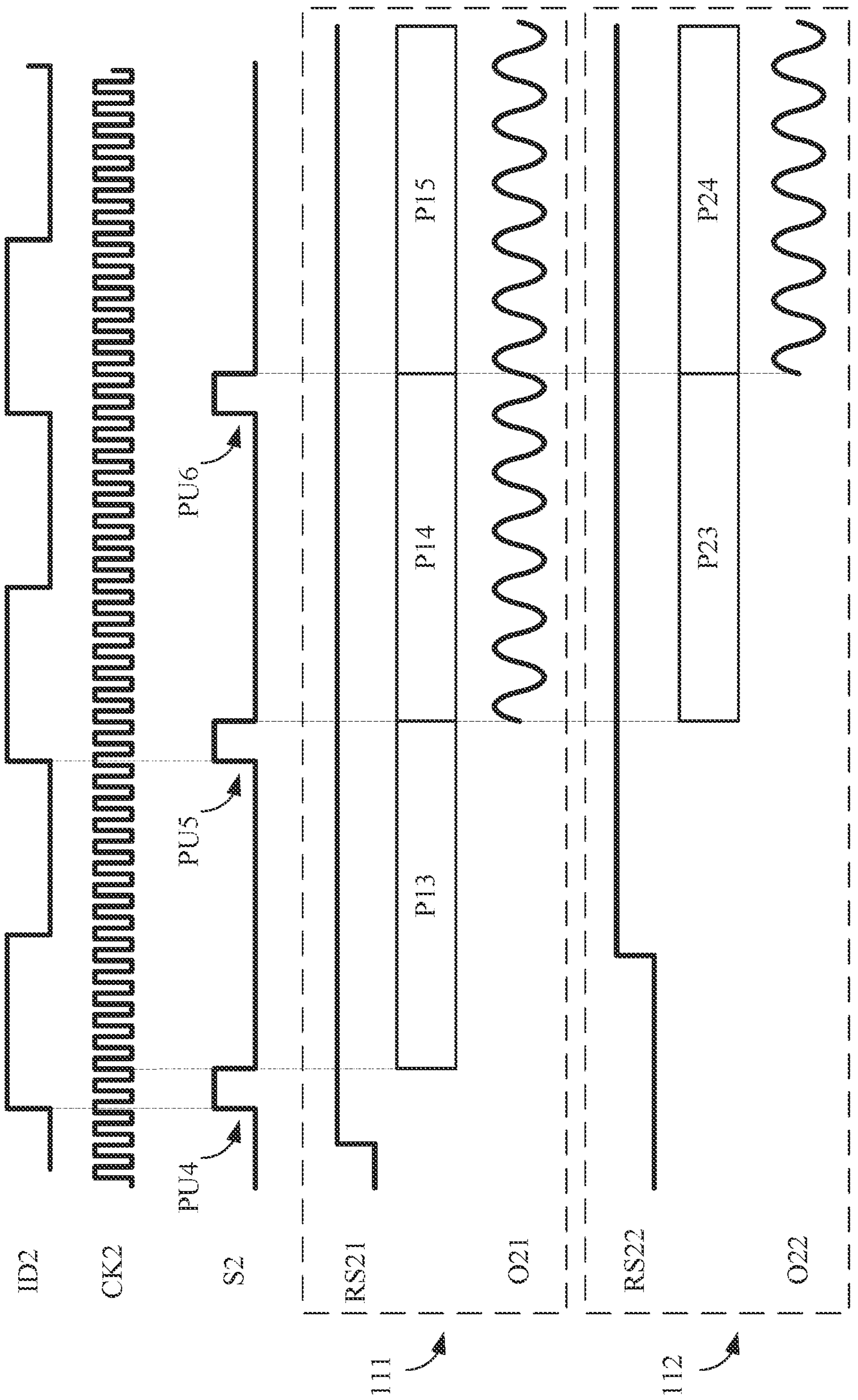

FIG. 3B depicts another schematic view of audio signal processing performed by the device shown in FIG. 2. The contents shown in FIG. 3B are only for easily illustrating the embodiment of the present disclosure, instead of limiting the scope of the present disclosure.

In the embodiments corresponding to FIG. 3B, the main processor 13 may provide an indication signal ID2 for both of the audio processors 11 and 12, and each of the audio processors 11 and 12 may generate a synchronization signal S2 according to the indication signal ID2. The indication signal ID2 may be substantially the same with the indication signal ID1. As for the synchronization signal S2, similar to the synchronization signal S1, it may also comprise at least one pulse (e.g., pulses PU4, PU5, and PU6 as shown in FIG. 3B), and a start of each pulse of the synchronization signal S2 may be aligned in time with a start of a pulse of the indication signal ID2. The frequency of the synchronization signal S2 may also equal the sampling frequency.

In some embodiments, the main processor 13 may also provide a clock signal CK2 for the audio processors 11 and 12. Similar to the aforementioned clock signal CK1, the clock signal CK2 may comprise a plurality of pulses, and an end of each pulse in the synchronization signal S2 is aligned in time with a start of one of the pulses in the clock signal CK2. That is, the synchronization signal S2 may be generated by the audio processors 11 and 12 according to both the indication signal ID2 and the clock signal CK2.

The main processor 13 may also provide resetting signals RS21 and RS22 for the audio processors 11 and 12, respectively, so as to perform a software reset for each of the two audio processors 11 and 12. One of the resetting signals RS21 and RS22 may similarly goes up to the logical high before the other one does, as previously mentioned with the resetting signals RS11 and RS12.

The audio processor 11 may begin its audio signal processing P13 at the end of the pulse PU4 first, since the resetting signal RS21 corresponding thereto has already gone up to the logical high, and audio signal processing P14 and P15 may then follow the audio signal processing P13. The audio processor 12, on the other hand, may begin its first audio signal processing P23 at the end of the pulse PU5, because the resetting signal RS22 corresponding thereto went up to the logical high later than the end of the pulse PU4. That is, the audio signal processing P13 and P23 may begin at the end of different pulses of the synchronization signal S2. The audio processors 11 and 12 may provide the output signals O21 and O22 for the audio output components SPK1 and SPK2, respectively. The audio output components SPK1 and SPK2 may then provide the audio outputs according to the output signals O21 and O22, respectively.

Even though the audio signal processing P13 and P23 (as well as the audio signal processing P14, P15, and P24 that follows either of them) begins at different time points, the phase difference between the two output signals O21 and O22 is still 360*N degrees (i.e., an integer multiple of an entire sine wave) since they both begin at an end of the pulse of the synchronization signal S2 (whose frequency equals the sampling frequency). Therefore, the audio outputs (i.e., the sound) of the two channels corresponding to the output signals O21 and O22 shall remain consistent and harmonic.

In some embodiments, the device 1 may be the integrated circuit that comprises at least the audio processors 11 and 12 and the main processor 13 as described above. However, in some other embodiments, the device 1 may be an audio playback device, and thus may additionally comprise the audio output components SPK1 and SPK2.

In some embodiments, the device 1 may comprise one or more storage components for storing necessary data/signals generated by any of the audio processors 11 and 12 and the main processor 13 as mentioned herein, or necessary data/signals received from external devices. In some embodiments, the device 1 may also comprise an I/O interface and/or a transceiver to receive data/signals from/to external devices.

In some embodiments, the audio processors 11 and 12 and the main processor 13 may be implemented on a processor of a computer (i.e., implemented via software simulation). Under such circumstances, each of the audio processors 11 and 12 and the main processor 13 may be a specific module of the processor, i.e., the structure of each of the audio processors 11 and 12 and the main processor 13 may correspond to a specific part of the processor of a computer that performs the same or equivalent functions (e.g., providing synchronization signals, resetting signals or performing audio signal processing) as previously mentioned.

Figure 4:
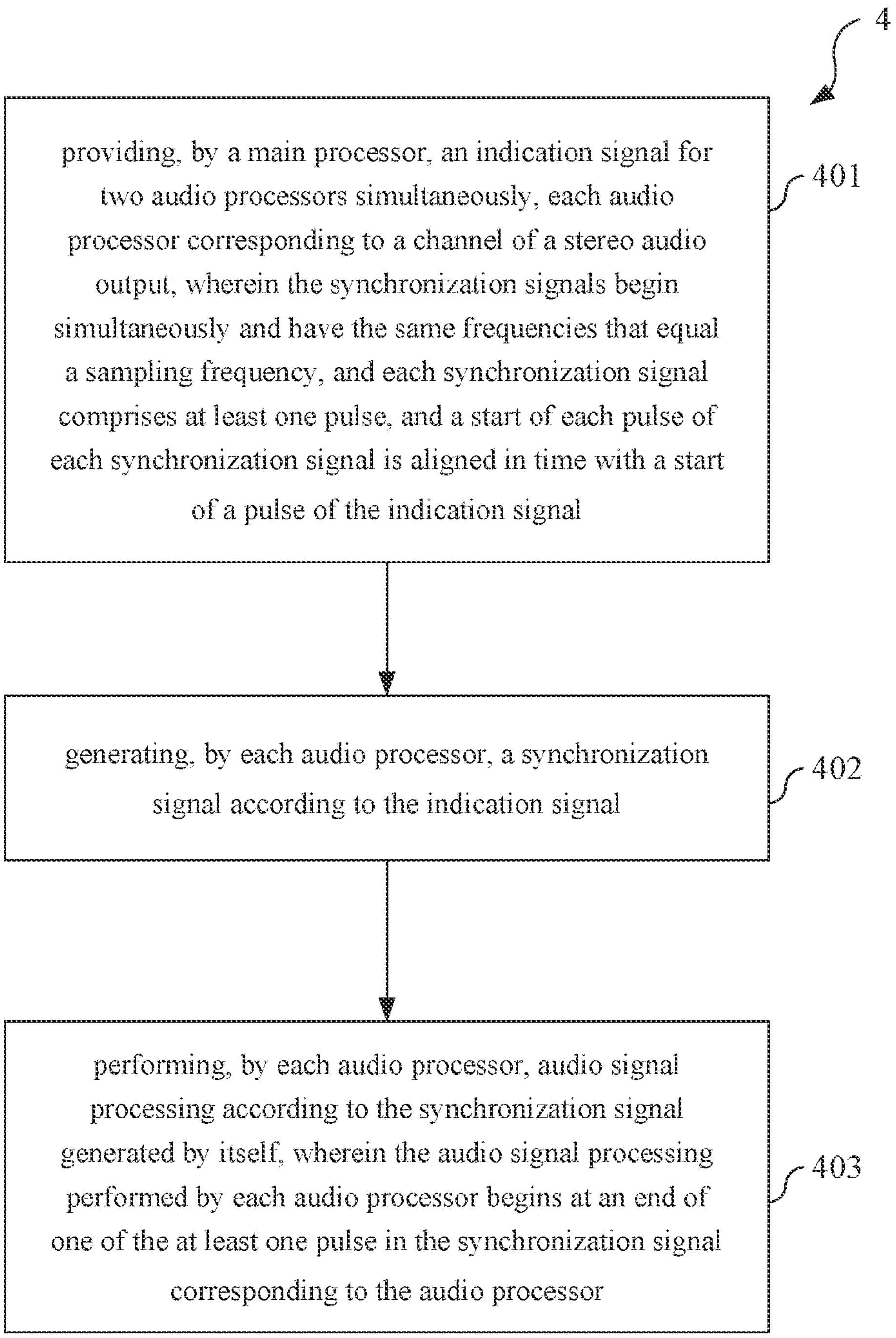
FIG. 4 depicts a method for audio signal processing according to one or more embodiments of the present disclosure.

FIG. 4 depicts a method for audio signal processing according to one or more embodiments of the present disclosure. The contents shown in FIG. 4 are only for easily illustrating the embodiment of the present disclosure, instead of limiting the scope of the present disclosure.

Please refer to FIG. 4. A method 4 for audio signal processing may comprise steps as follows:

- providing, by a main processor, an indication signal for two audio processors simultaneously, each audio processor corresponding to a channel of a stereo audio output, wherein the synchronization signals begin simultaneously and have the same frequencies that equal a sampling frequency, and each synchronization signal comprises at least one pulse, and a start of each pulse of each synchronization signal is aligned in time with a start of a pulse of the indication signal (labeled as a step 401);
- generating, by each audio processor, a synchronization signal according to the indication signal (labeled as a step 402); and
- performing, by each audio processor, audio signal processing according to the synchronization signal generated by itself, wherein the audio signal processing performed by each audio processor begins at an end of one of the at least one pulse in the synchronization signal corresponding to the audio processor (labeled as a step 403);

In some embodiments, the method 4 may further comprise a step as follows: providing, by the main processor, two resetting signals for the two audio processors, respectively. In said step, one of the two resetting signals goes up to a logical high before the other one does, and the audio signal processing performed by each audio processor begins when the resetting signal provided therefor is on the logical high.

In some embodiments, regarding the method 4, each audio signal processing may be Digital Signal Processing (DSP).

In some embodiments, regarding the method 4, each audio signal processing may be in an Inter-IC Sound (I2S) format, and the indication signal is an LRCIN signal of the I2S format.

In some embodiments, regarding the method 4, each audio signal processing may be in a Sony/Philips Digital Interface Format (S/PDIF), and the indication signal may be a preamble in the S/PDIF. Moreover, in some embodiments, the indication signal may be one of a preamble X, a preamble Y, and a preamble Z in the S/PDIF.

In some embodiments, the method 4 may further comprise steps as follows:

- generating, by each audio processor, an output signal when the audio signal processing therein is completed;
- transmitting, by the audio processors, the output signals to two audio output components, respectively; and
- providing, by the audio output components, the stereo audio output according to the output signals.

In some embodiments, the method 4 may further comprise a step of: providing, by the main processor, a clock signal for the audio processors. In said step, each audio processor generates the synchronization signal according to both the indication signal and the clock signal. Moreover, in some embodiments, the clock signal may comprise a plurality of pulses, and an end of each pulse in each synchronization signal is aligned in time with a start of one of the pulses in the clock signal.

Each embodiment of the method 4 basically corresponds to a certain embodiment of the device 1. Therefore, those of ordinary skill in the art may fully understand and implement all the corresponding embodiments of the method 4 simply by referring to the above descriptions of the device 1, even though not all of the embodiments of the method 4 are described in detail above.

The above disclosure is related to the detailed technical contents and inventive features thereof. People of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A device for audio signal processing, comprising:

two audio processors, each audio processor corresponding to a channel of a stereo audio output and being configured to generate a synchronization signal according to an indication signal and perform audio signal processing according to the synchronization signal, wherein:

the synchronization signals begin simultaneously and have the same frequencies that equal a sampling frequency;

each synchronization signal comprises at least one pulse, and a start of each pulse of each synchronization signal is aligned in time with a start of a pulse of the indication signal; and the audio signal processing performed by each audio processor begins at an end of one of the at least one pulse in the synchronization signal corresponding to the audio processor; and a main processor, being electrically connected with the two audio processors and configured to provide the indication signal for the two audio processors.

2. The device of claim 1, wherein the main processor is further configured to provide two resetting signals for the two audio processors, respectively, wherein one of the two resetting signals goes up to a logical high before the other one does, and the audio signal processing performed by each audio processor begins when the resetting signal provided therefor is on the logical high.

3. The device of claim 1, wherein each audio signal processing is Digital Signal Processing (DSP).

4. The device of claim 1, wherein each audio signal processing is in an Inter-IC Sound ($I^2S$) format, and the indication signal is an LRCIN signal.

5. The device of claim 1, wherein each audio signal processing is in a Sony/Philips Digital Interface Format (S/PDIF), and the indication signal is a preamble in the S/PDIF.

6. The device of claim 5, wherein the indication signal is one of a preamble X, a preamble Y, and a preamble Z in the S/PDIF.

7. The device of claim 1, further comprising two audio output components electrically connected with the two audio processors, respectively, wherein:

each audio processor is further configured to generate an output signal when the audio signal processing performed thereby is completed, and transmit the output signal to the audio output component connected thereto; and the two audio output components are configured to provide the stereo audio output according to the output signals, respectively.

8. The device of claim 1, wherein the main processor is further configured to provide a clock signal for the two audio processors, and each audio processor generates the synchronization signal according to both the indication signal and the clock signal.

9. The device of claim 8, wherein the clock signal comprises a plurality of pulses, and an end of each pulse in each synchronization signal is aligned in time with a start of one of the pulses in the clock signal.

10. A method for audio signal processing, comprising steps as follows:

providing, by a main processor, an indication signal for two audio processors simultaneously, each audio processor corresponding to a channel of a stereo audio output;

generating, by each audio processor, a synchronization signal according to the indication signal; and performing, by each audio processor, audio signal processing according to the synchronization signal generated by itself;

wherein:

the synchronization signals begin simultaneously and have the same frequencies that equal a sampling frequency;

each synchronization signal comprises at least one pulse, and a start of each pulse of each synchronization signal is aligned in time with a start of a pulse of the indication signal; and the audio signal processing performed by each audio processor begins at an end of one of the at least one pulse in the synchronization signal corresponding to the audio processor.

11. The method of claim 10, further comprising:

providing, by the main processor, two resetting signals for the two audio processors, respectively, wherein:

one of the two resetting signals goes up to a logical high before the other one does; and the audio signal processing performed by each audio processor begins when the resetting signal provided therefor is on the logical high.

12. The method of claim 10, wherein each audio signal processing is Digital Signal Processing (DSP).

13. The method of claim 10, wherein each audio signal processing is in an Inter-IC Sound ($I^2S$) format, and the indication signal is an LRCIN signal of the $I^2S$ format.

14. The method of claim 10, wherein each audio signal processing is in a Sony/Philips Digital Interface Format (S/PDIF), and the indication signal is a preamble in the S/PDIF.

15. The method of claim 14, wherein the indication signal is one of a preamble X, a preamble Y, and a preamble Z in the S/PDIF.

16. The method of claim 10, further comprising:

generating, by each audio processor, an output signal when the audio signal processing therein is completed;

transmitting, by the audio processors, the output signals to two audio output components, respectively; and providing, by the audio output components, the stereo audio output according to the output signals.

17. The method of claim 10, further comprising:

providing, by the main processor, a clock signal for the audio processors;

wherein each audio processor generates the synchronization signal according to both the indication signal and the clock signal.

18. The method of claim 17, wherein the clock signal comprises a plurality of pulses, and an end of each pulse in each synchronization signal is aligned in time with a start of one of the pulses in the clock signal.

* * * * *